(12) United States Patent
Georges (10) Patent No.: US 8,296,995 B1
(45) Date of Patent: Oct. 30, 2012

(54) TREE PROTECTION AND WATER SAVING APPARATUS

(76) Inventor: John G. Georges, Arcadia, FL (US)

( * ) Notice: Subject to any disclaimer, the term of this patent is extended or adjusted under 35 U.S.C. 154(b) by 0 days.

(21) Appl. No.: 13/274,929

(22) Filed: Oct. 17, 2011

(51) Int. Cl.
*A01G 13/02* (2006.01)
*A01G 13/06* (2006.01)
*A01G 25/02* (2006.01)

(52) U.S. Cl. ............ 47/21.1; 47/20.1; 47/23.2; 47/23.3; 47/29.5; 47/30; 47/31.1

(58) Field of Classification Search ............ 47/21.1, 47/23.2, 23.3, 31.1, 32, 29.5
See application file for complete search history.

(56) References Cited

U.S. PATENT DOCUMENTS

| | | | | |
|---|---|---|---|---|
| 219,987 A * | 9/1879 | Scott | | 47/32.4 |
| 2,006,562 A * | 7/1935 | Scheu | | 47/2 |
| 3,841,558 A * | 10/1974 | Fowler et al. | | 239/11 |
| 3,890,740 A * | 6/1975 | Miller | | 47/1.01 R |
| 4,028,847 A * | 6/1977 | Davis et al. | | 47/65 |
| 4,642,938 A * | 2/1987 | Georges et al. | | 47/2 |
| 4,651,465 A * | 3/1987 | Lilly | | 47/2 |
| 5,212,905 A * | 5/1993 | Philoctete | | 47/48.5 |
| 5,661,925 A * | 9/1997 | MacMaster | | 47/32.4 |
| 5,878,528 A * | 3/1999 | Pattyn | | 47/32 |
| 6,640,491 B1 * | 11/2003 | Fox | | 47/23.3 |
| 7,080,484 B2 * | 7/2006 | Littge | | 47/79 |
| 2005/0081441 A1 * | 4/2005 | Mantovani | | 47/67 |

* cited by examiner

*Primary Examiner* — Monica Williams
*Assistant Examiner* — Marc Burgess
(74) *Attorney, Agent, or Firm* — Ronald E. Smith; Smith & Hopen, P.A.

(57) ABSTRACT

A water-saving device includes a frusto-conical housing having a wide lower end that overlies a ground surface. A lip is integrally formed at the upper end, extending radially inwardly. A vertical cut is formed in the housing with a flange adjoining each edge of the cut. The flanges are spaced apart to admit a tree trunk into the hollow interior of the housing and are attachable to one another to enclose a tree trunk. A first pair of apertures is formed in the lip. A conduit has a first end in fluid communication with a row hose and extends upwardly from the row hose, through a first aperture, and downwardly through the second aperture. A water emitter is in fluid communication with a second end of the conduit and is positioned within the hollow interior of the housing below the lip and above the ground surface.

4 Claims, 6 Drawing Sheets

TREE PROTECTION AND WATER SAVING APPARATUS

BACKGROUND OF THE INVENTION

1. Field of the Invention

This invention relates to devices that protect trees from inclement weather conditions and also save water. More particularly, it relates to an improved apparatus that is adjustable to accommodate trees of varying sizes and which also eliminates parts that were required by prior art tree protecting and water saving devices.

2. Brief Description of the Related Art

U.S. Pat. No. 4,642,938 to Georges discloses a commercially successful device that protects young citrus trees and other plants against the extremes of weather, particularly freezing temperatures and high wind conditions. A condition known as the "super cooling effect" occurs when high velocity winds at low temperatures, combined with a low dew point, causes moisture to evaporate at a very high rate; it is a serious threat to many plants, particularly young citrus trees. The patented device provides protection from the super cooling effect.

The patented device also has great utility as a water-saving device. Since it surrounds a tree at its base and provides a housing for a water emitter within its hollow interior, it reduces water consumption from about 26,000 gallons of water per year per tree to about nine hundred (900) gallons per year per tree.

There are two (2) limitations to the patented structure. First, it cannot be expanded to accommodate trees as they grow. Second, it requires that a water emitter/atomizer placed inside the housing either be attached to a stake that is mounted directly to a row hose or to a stake that is connected to a row hose through a conduit.

An improved system would include an expandable housing and would eliminate the need for a stake that holds the water emitter/atomizer.

However, in view of the art considered as a whole at the time the present invention was made, it was not obvious to those of ordinary skill in the field of this invention that the identified improvements were needed nor was it known how to provide such improvements.

BRIEF SUMMARY OF THE INVENTION

The long-standing but heretofore unfulfilled need for an improved tree-protecting and water-saving device is now met by a new, useful, and nonobvious invention. The present disclosure relates to a plant protection system that provides environmental protection. More particularly, the present invention relates to a protection system for plants that uses a housing and an individual source of heat within the housing to protect against environmental extremes such as cold weather by shielding against the elements.

The present invention provides environmental regulation of the immediate surrounding area of a plant or multiple plants with individual housings which enables the use of outside sources of energy to provide plant protection and watering as required. The present system also provides a protected control area for chemical application and shields the plant from outside sources of damage. The novel structure includes a housing which may be removable seasonally or left in place so long as it is of service to the plant. Various housing designs and constructions that use the principles of the basic concept as disclosed herein are within the scope of the present invention.

In a first embodiment of the invention, the housing is in the form of a truncated cone. Such a configuration is representative of a style of housing with specific characteristics which fulfill the requirements of the basic principles of the invention. However, it is intended that other forms of housing may be employed, of any design or shape which gives the specified results. Thus the housing may be a unit of any design which houses one or more plants and modifies the environmental conditions surrounding the plant so as to aid growth and husbandry practices while protecting vital parts of the plant from environmental and foreign damage by enabling the application of heat to protect the plant from damaging cold, preventing chill factors from creating super cold temperatures in the control area, retaining maximum heat from applied energy, shielding against damaging outside forces, creating no adverse conditions for plant growth, providing permanent and seasonal protection, providing a protected control area for application of agricultural chemicals, and creating a shielded central area for the plant or plants enclosed by the housing.

More particularly, the novel plant-protecting and water-saving device includes a frusto-conical housing having a wide lower end adapted to overlie a ground surface and a narrow upper end. A base flange is integrally formed with the lower end of the housing and the base flange extends radially outwardly from the lower end. The base flange is adapted to be covered with earth to hold the housing against movement in high wind conditions.

A lip is integrally formed at the upper end of the housing and extends radially inwardly from the upper end. A first vertical cut is formed in the housing and extends through the lip and through the base flange.

A first pair of connection flanges includes a first connection flange formed integrally with each edge of the first vertical cut. The first connection flanges are spaced apart from one another to admit a tree trunk into the hollow interior of the housing and the connection flanges are releasably attachable to one another to enclose a tree trunk in the hollow interior.

A first pair of small, conduit-receiving apertures is formed in the lip in circumferentially spaced apart relation to one another. Multiple pairs of such small apertures may be formed in the lip for convenience.

A second pair of larger apertures is formed in the housing, slightly above the base flange, in circumferentially spaced apart relation to one another and in offset relation to a diameter of the housing. The second pair of apertures accommodates a row hose that enters into a hollow interior of the housing and exits the hollow interior through first and second apertures of the second pair of larger apertures, respectively.

A conduit has a first end adapted for fluid communication with the row hose, and follows a path of travel that extends upwardly from the row hose, extending upwardly through a first aperture of the first pair of apertures and downwardly through a second aperture of the first pair of apertures.

A water atomizer and emitter is in fluid communication with a second end of the conduit. The second end of the conduit and the water emitter and atomizer are positioned within the hollow interior of the housing in vertically spaced relation below the lip and above the ground surface.

In a second embodiment, a second vertical cut is formed in the housing and extends through the lip and through the base flange. A second pair of connection flanges includes second connection flanges formed integrally with each edge of the second vertical cut. The second pair of connection flanges are spaced apart from one another to admit a tree trunk into the hollow interior of the housing and the second pair of connection flanges are releasably attachable to one another to enclose a tree trunk in the hollow interior when the first pair of connection flanges are releasably secured to one another.

The second vertical cut is diametrically opposed to the first vertical cut so that the housing includes two separate halves of equal size and shape.

In a third embodiment, a second and a third vertical cut are formed in the housing and extend through the lip and through the base flange. A third pair of connection flanges includes third connection flanges formed integrally with each edge of the third vertical cut and the second and third pair of connection flanges are spaced apart from one another to admit a tree trunk into the hollow interior of the housing.

The second and third pairs of connection flanges are respectively releasably attachable to one another to enclose a tree trunk in the hollow interior when the first pair of connection flanges are releasably secured to one another. The first, second, and third vertical cuts are equidistantly and circumferentially spaced apart from one another so that the housing includes three separate parts of equal size and shape.

In a fourth embodiment, a second, a third, and a fourth vertical cut are formed in the housing, said second, third, and fourth vertical cuts extending through the lip and through the base flange. A fourth pair of connection flanges includes fourth connection flanges formed integrally with each edge of the fourth vertical cut, said first, second, third and fourth pairs of connection flanges being equidistantly and circumferentially spaced apart from one another to admit a tree trunk into the hollow interior of the housing so that the housing includes four separate parts of equal size and shape.

BRIEF DESCRIPTION OF THE DRAWINGS

For a fuller understanding of the invention, reference should be made to the following detailed description, taken in connection with the accompanying drawings, in which.

DETAILED DESCRIPTION OF THE PREFERRED EMBODIMENT

Figure 1:
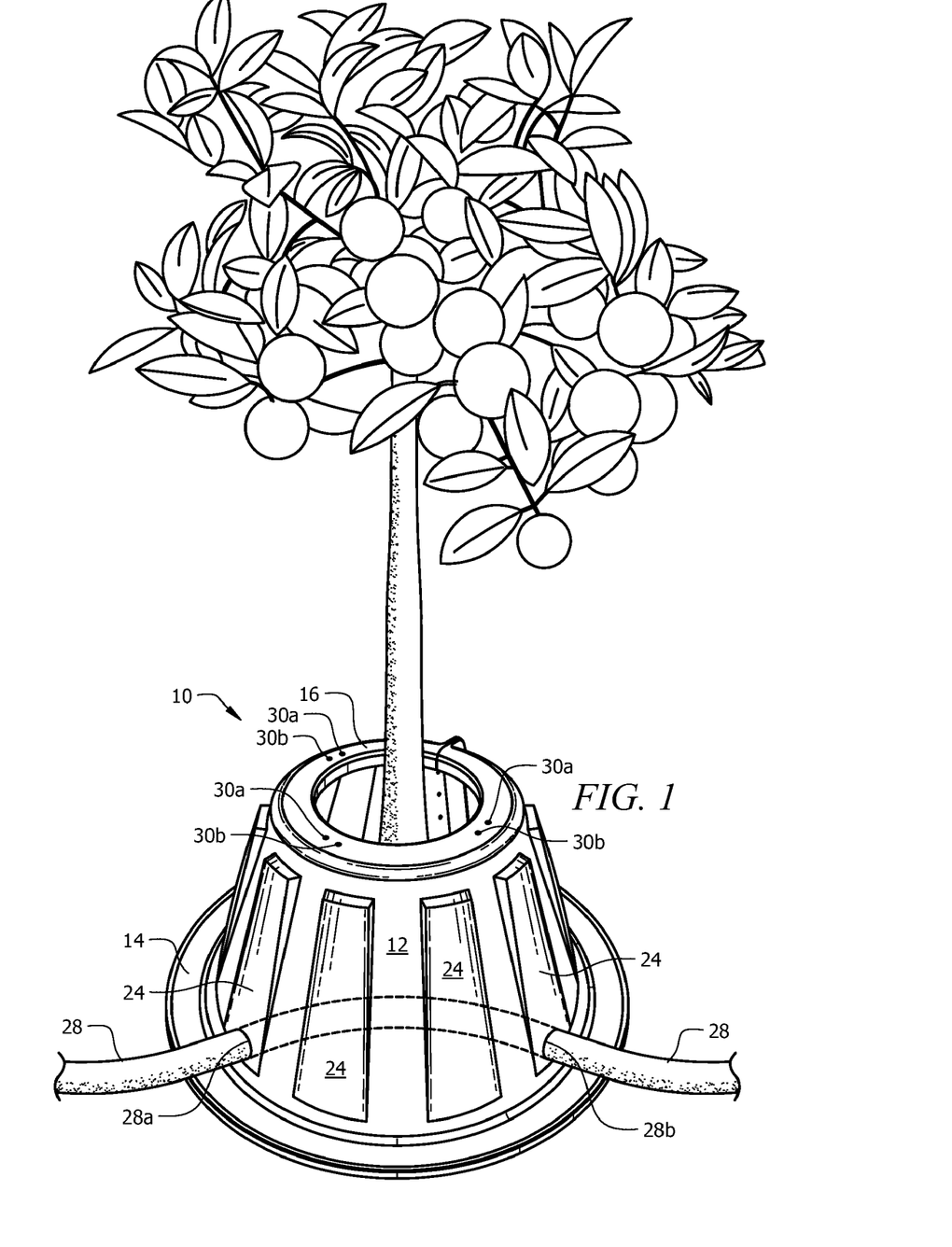
FIG. 1 is a perspective view depicting the novel device in use.

The novel structure is denoted as a whole in FIG. 1 by the reference numeral 10.

Plant protection apparatus 10 includes a generally frusto-conical housing 12 having horizontally extending base 14 formed about its lower peripheral edge. Its upper rim 16 extends radially inwardly and has a downwardly concave configuration.

Base flange 14 is covered with dirt, clay, or the like in order to anchor device 10 against displacement by winds after the device has been positioned in protective relation to a tree.

Housing 12 may be constructed of a light-in-weight but durable material such as high density polyethylene. The preferred thickness is about sixty millimeters (60 mm) but that dimension is not critical.

Figure 2:
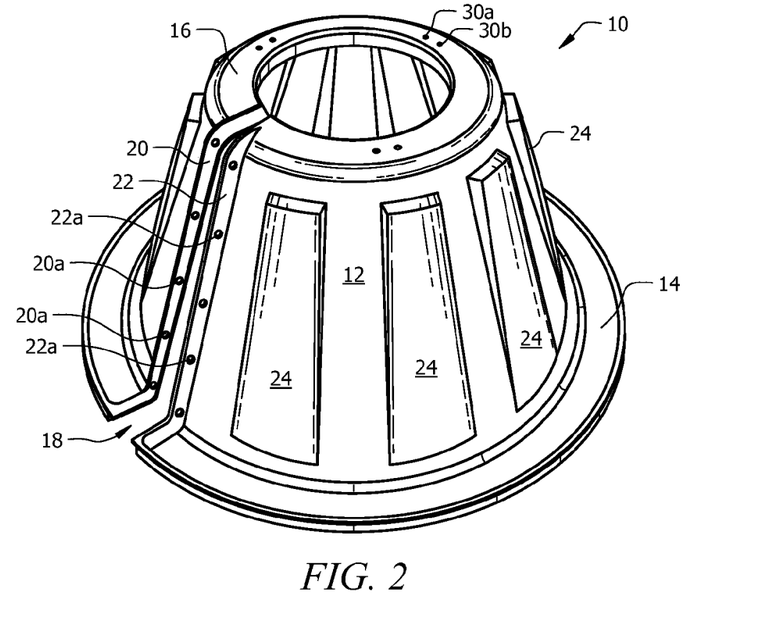
FIG. 2 is a first perspective view depicting the flanges of the base in spaced apart relation to one another.
Figure 3:
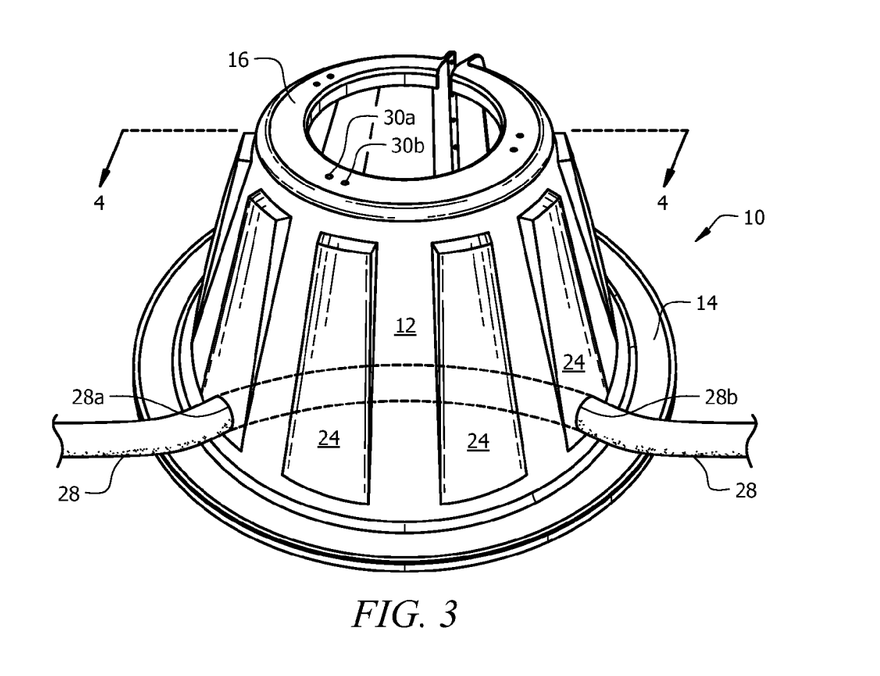
FIG. 3 is a second perspective view of the embodiment of FIG. 2.

In a first embodiment, as best depicted in FIG. 2, housing 12 has a single vertically-extending cut 18 formed therein to admit a tree into the hollow interior of housing 12.

First flange 20 is formed integrally with a first edge of cut 18 and second flange 22 is formed integrally with a second edge of cut 18. Multiple apertures 20a are formed in flange 20 along its extent in equidistantly spaced elation to one another and multiple apertures 22a are formed in flange 22 along its extent in equidistantly spaced relation to one another. A plurality of releasable fasteners, not depicted to avoid cluttering the drawings, extend through said apertures to facilitate joining opposing flanges 20, 22 in abutting relation to one another, as depicted in FIG. 1, to capture a tree trunk in the hollow interior of housing 12, said tree trunk of course admitted into said hollow interior prior to joining said abutting flanges to one another.

A plurality of vertically extending, generally rectangular shaped ridges or protrusions 24 are formed in the walls of housing 12, in equidistantly and circumferentially spaced apart relation to one another, to increase the structural integrity of housing 12.

The novel structure provides an environmental control which uses heat from well water. The use of water from another source such as a lake or stream and the use of other sources of heat is within the scope of this invention.

In a preferred embodiment, housing 12 has an interior diameter at its lower end of about twenty three inches (23"), an interior diameter at upper end 16 of about eight inches (8"), and a vertical height of about fourteen inches (14").

Figure 4:
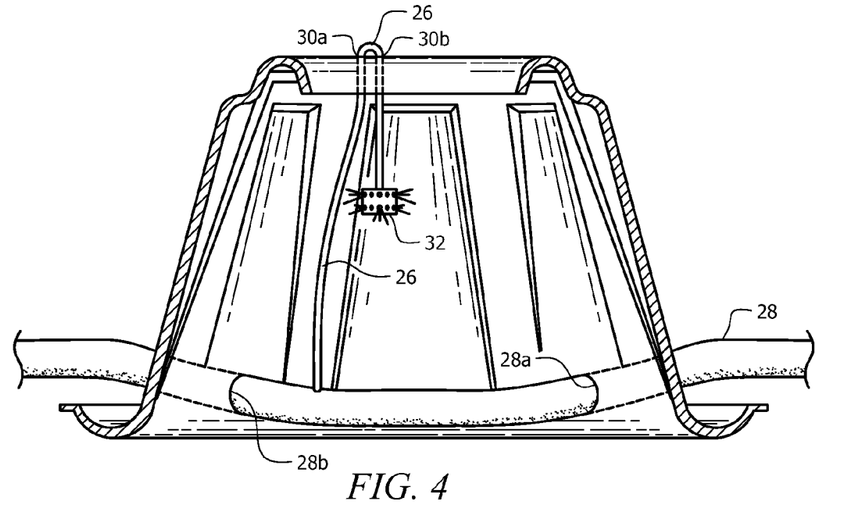
FIG. 4 is a sectional view taken along line 4-4 in FIG. 3.

As best understood in connection with FIG. 4, warm water is sprayed into the hollow interior of housing 12 by water atomizer and spray emitter 32 which is mounted within the hollow interior of housing 12 in a novel way. Novel conduit 26 is connected in fluid communication with row hose 28 that enters into housing 12 through opening 28a and which exits housing 12 through opening 28b, said openings being formed in housing 12 just above base flange 14. Row hose 28 carries water from a remote water source such as an irrigation system and extends through openings 28a, 28b that are formed in housing 12.

More particularly, conduit 26 has a first end in fluid communication with row hose 28. Conduit 26 extends upwardly as depicted in FIG. 4 from said row hose 28 and extends sequentially first through first opening 30a formed in upper rim 16 of housing 12 and then downwardly through second opening 30b. A suitable water atomizer and emitter 32 is secured to the second, free end of conduit 26 in the hollow interior of housing 12 at a preselected distance below rim 16.

Novel apertures 30a, 30b thus enable mounting of emitter 32 in the hollow interior of housing 12 without the need of the prior art stake. This reduces the cost of the installation on a per tree basis, thus saving a large sum for those growers who own numerous trees.

Instead of freely extending conduit 26 from row hose 28 to first aperture 30a as depicted in FIG. 4, conduit 26 could instead extend through a tunnel formed in an interior surface of housing 12.

Figure 5A:
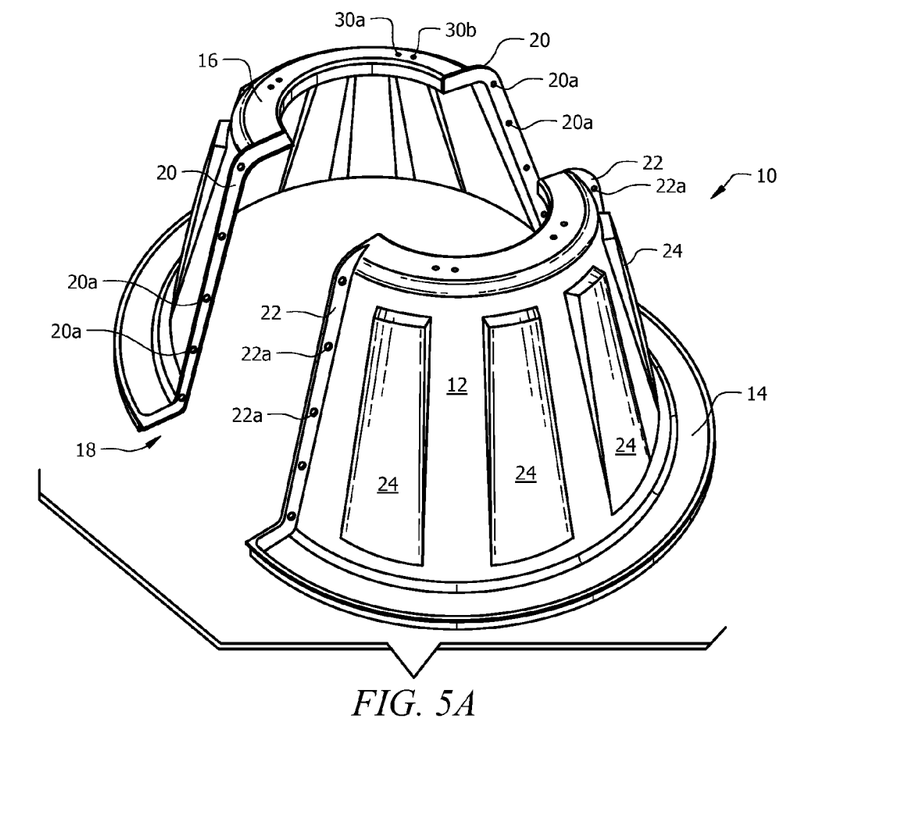
FIG. 5A is an exploded perspective view of a second embodiment.
Figure 5B:
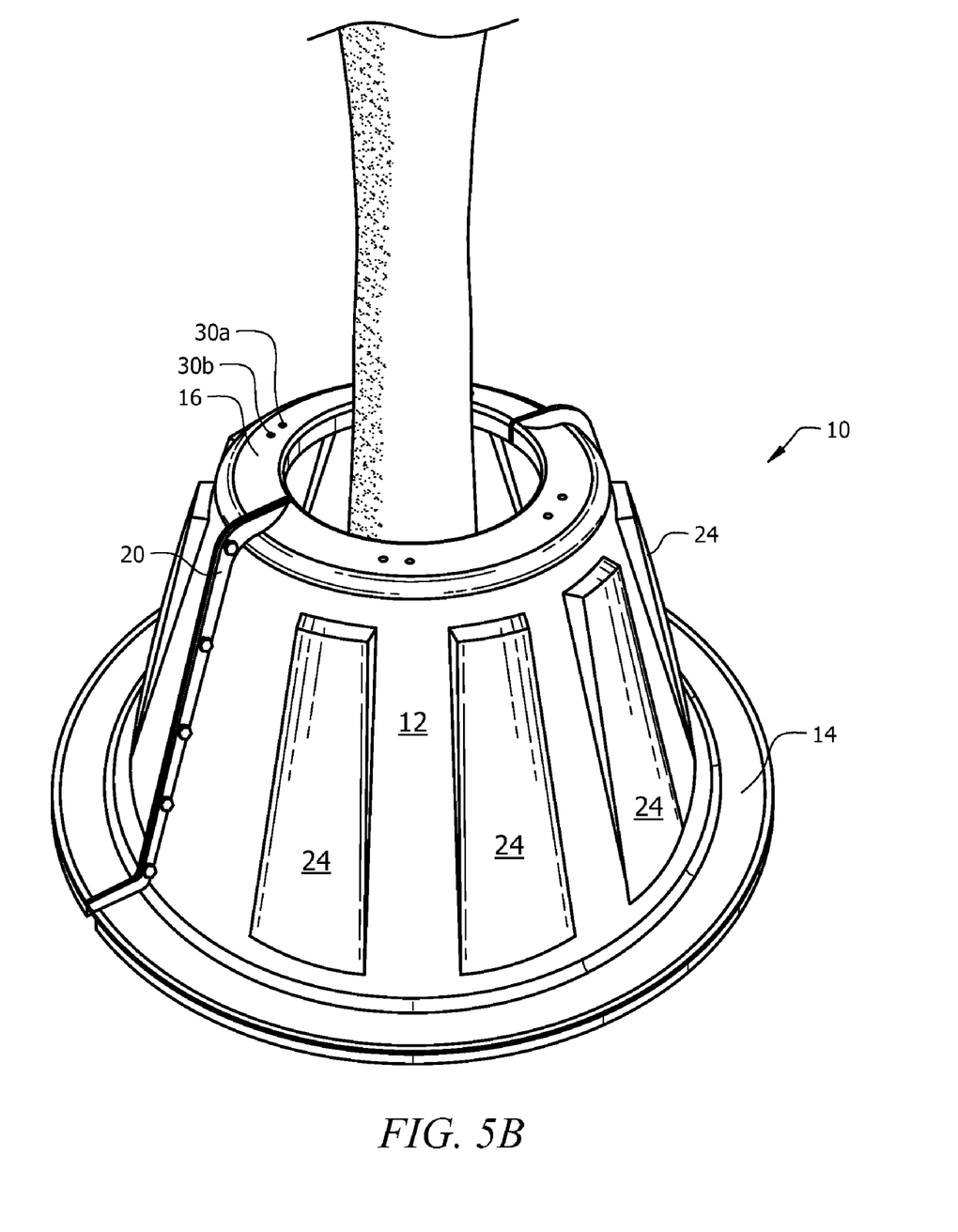
FIG. 5B is an assembled perspective view of the second embodiment.

The second embodiment of FIGS. 5A and 5B differs from the first embodiment in that two vertical cuts are formed in housing or base 12 and the circumference of rim 16 and base flange 14 is increased to a larger circumference than the rim and base flange of the first embodiment. This enables protection and watering of trees that have grown too large to fit into the relatively small housing or base of the first embodiment.

Figure 6A:
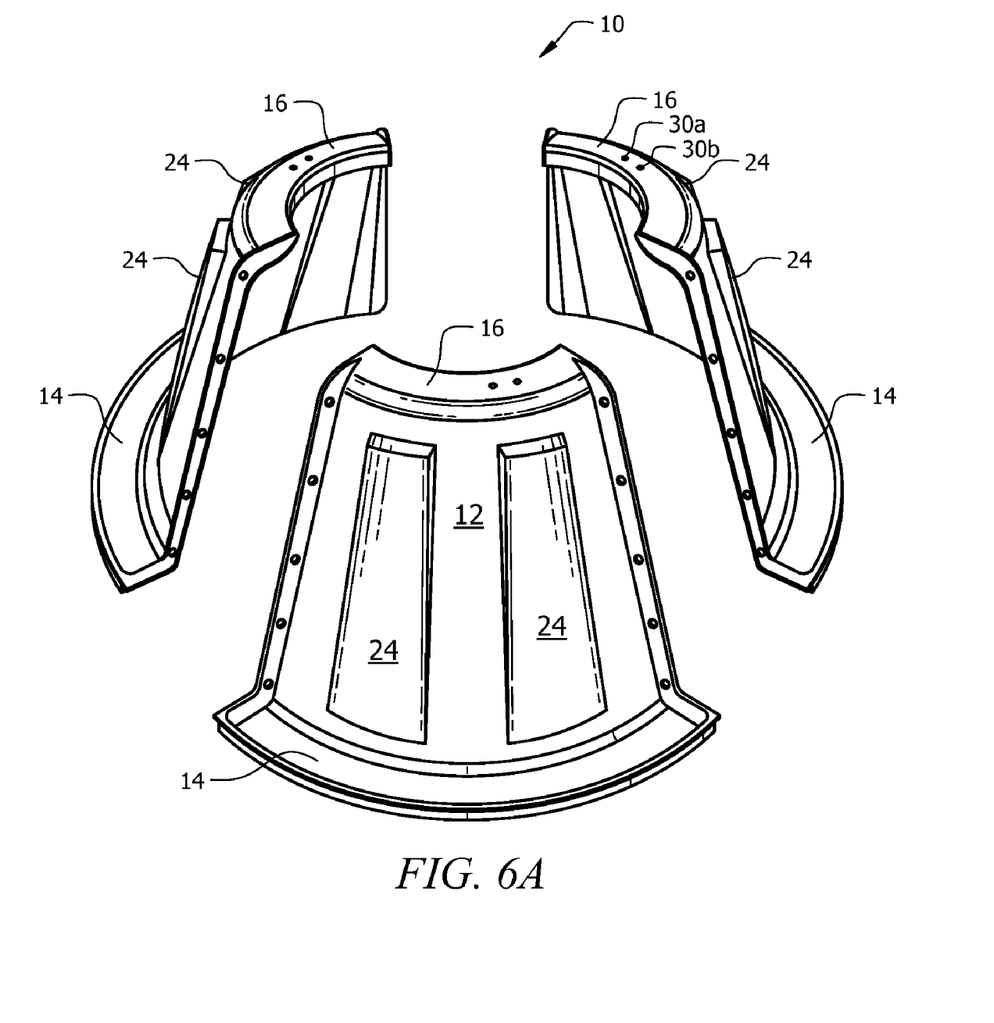
FIG. 6A is an exploded perspective view of a third embodiment.
Figure 6B:
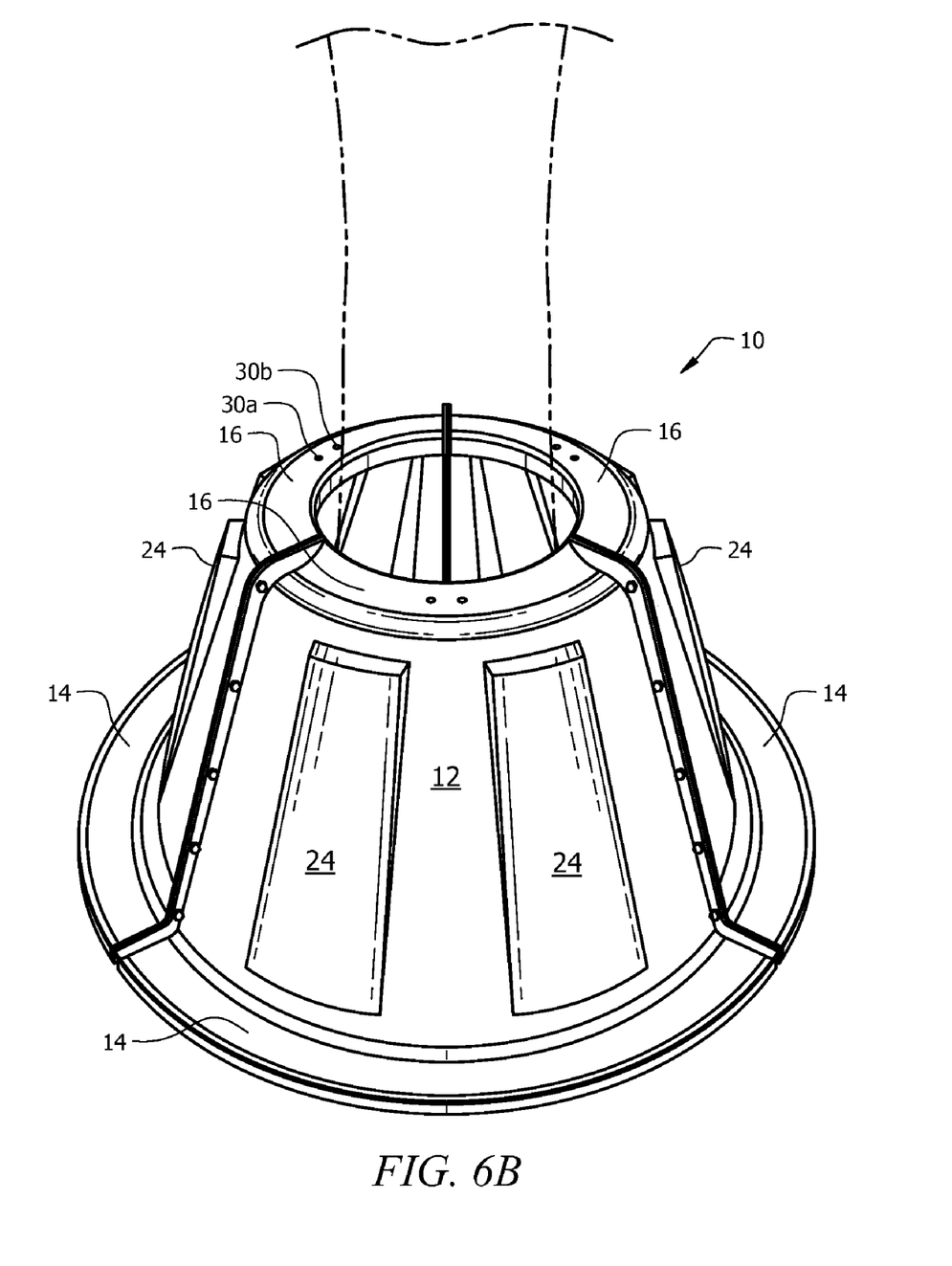
FIG. 6B is an assembled perspective view of the third embodiment.

The third embodiment of FIGS. 6A and 6B differs from the first embodiment in that three vertical cuts are formed in housing or base 12 and the circumference of rim 16 and base flange 14 is increased to a larger circumference than the rim and base flange of the second embodiment. This enables protection and watering of trees that have grown too large to fit into the housing of the second embodiment.

All embodiments of housing 12 provide a wide area its bottom to disperse the heat from the warm water that is atomized by the emitter. The heat is concentrated as the warm fog or water vapor rises up the sides of frusto-conical housing 12 to smaller diameter upper rim 16. Upper lip or rim 16 then directs the heated water vapor downwardly to provide an additional warming effect within housing 12.

A shrub-head sprayer nozzle or a jet spray nozzle or a fog head may be employed, using a one hundred eighty degree (180°) or three hundred degree (300°) spray pattern. The spray pattern is selected to avoid applying water directly to a tree trunk but all spray patterns are within the scope of this invention. It is also within the scope of the invention to employ a plurality of emitters within the interior of housing 12 but a single emitter 32 is preferred.

Water is supplied by a pump to the interior of housing 12 at a rate of about five to thirty gallons per hour (5-30 gal/hr), at a pressure of approximately ten to twenty five pounds per square inch (10-25 psi), in keeping with conventional low volume spray irrigation.

The plant protection system of the present invention retains maximum heat from applied water, maintains optimum emitter jet position, shields against wind, protects the tree trunk and buds from animal damage, insures maximum benefits from applied water, permits use of approved herbicides and acts as a herbicide diffuser, reduces trunk sprouting and weed growth, increases growth rate with ideal conditions, prevents trunk damage due to sweating, and eliminates trunk damage from super cooling.

The frusto-conical cone shape of housing 12 is ideally suited for stacking in groups in a citrus grove or other area in which the novel system is to be employed.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

What is claimed is:

1. A water-saving device, comprising:
a frusto-conical housing having a wide lower end adapted to overlie a ground surface and a narrow upper end;
a base flange integrally formed with said lower end of said housing, said base flange extending radially outwardly from said lower end, said base flange adapted to be covered with earth to hold said housing against movement in high wind conditions;
a lip integrally formed at said upper end of said housing, said lip extending radially inwardly from said upper end;
a first vertical cut formed in said housing, said vertical cut extending through said lip and through said base flange;
a first pair of connection flanges, there being one first connection flange formed integrally with each edge of said first vertical cut, said first connection flanges being spaced apart from one another to admit a tree trunk into the hollow interior of said housing and said first connection flanges being releasably attachable to one another to enclose a tree trunk in said hollow interior;
a first pair of apertures formed in said lip in spaced apart relation to one another;
a second pair of apertures formed in said housing, slightly above said base flange, in circumferentially spaced apart relation to one another and in offset relation to a diameter of said housing, said second pair of apertures accommodating a row hose that enters into a hollow interior of said housing and exits said hollow interior through first and second apertures of said pair of apertures, respectively;
a conduit having a first end adapted for fluid communication with said row hose, said conduit following a path of travel that extends upwardly from said row hose, extending upwardly through a first aperture of said first pair of apertures and downwardly through a second aperture of said first pair of apertures;
a water atomizer and emitter in fluid communication with a second end of said conduit; and
said second end of said conduit and said water emitter and atomizer being positioned within said hollow interior of said housing in vertically spaced relation below said lip and above said ground surface.

2. The water-saving device of claim 1, further comprising:
a second vertical cut formed in said housing, said second vertical cut extending through said lip and through said base flange;
a second pair of connection flanges, there being one second connection flange formed integrally with each edge of said second vertical cut, said second connection flanges being spaced apart from one another to admit a tree trunk into the hollow interior of said housing and said second connection flanges being releasably attachable to one another to enclose a tree trunk in said hollow interior when said first connection flanges are releasably secured to one another;
said second vertical cut being diametrically opposed to said first vertical cut so that said housing includes two separate halves of equal size and shape.

3. The water-saving device of claim 1, further comprising:
a second and a third vertical cut formed in said housing, said second and third vertical cuts extending through said lip and through said base flange;
a second and a third pair of connection flanges, there being one second connection flange formed integrally with each edge of said second vertical cut, and there being one third connection flange formed integrally with each edge of said third vertical cut, said second and third pair of connection flanges being spaced apart from one another to admit a tree trunk into the hollow interior of said housing and said second and third pair of connection flanges being releasably attachable to one another to enclose a tree trunk in said hollow interior when said first connection flanges are releasably secured to one another;
said first, second, and third vertical cuts being equidistantly and circumferentially spaced apart from one another so that said housing includes three separate parts of equal size and shape.

4. The water-saving device of claim 1, further comprising:
a second, a third, and a fourth vertical cut formed in said housing, said second, third, and fourth vertical cuts extending through said lip and through said base flange;
a second, a third, and a fourth pair of connection flanges, there being one second connection flange formed integrally with each edge of said second vertical cut, there being one third connection flange formed integrally with each edge of said third vertical cut, and there being one fourth connection flange formed integrally with each edge of said fourth vertical cut, said second, third, and fourth pair of connection flanges being spaced apart from one another to admit a tree trunk into the hollow interior of said housing and said second, third and fourth pair of connection flanges being releasably attachable to one another to enclose a tree trunk in said hollow interior when said first connection flanges are releasably secured to one another;

said first, second, third and fourth vertical cuts being equidistantly and circumferentially spaced apart from one another so that said housing includes three separate parts of equal size and shape.

* * * * *